United States Patent
Linden

(10) Patent No.: US 11,865,458 B2
(45) Date of Patent: *Jan. 9, 2024

(54) SYSTEMS AND METHODS FOR ENABLING EXCHANGE OF TRADEABLE ITEMS

(71) Applicant: Mythical, Inc., Sherman Oaks, CA (US)

(72) Inventor: John Linden, Sherman Oaks, CA (US)

(73) Assignee: Mythical, Inc., Sherman Oaks, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/738,667

(22) Filed: May 6, 2022

(65) Prior Publication Data

US 2022/0258060 A1 Aug. 18, 2022

Related U.S. Application Data

(63) Continuation of application No. 16/839,774, filed on Apr. 3, 2020, now Pat. No. 11,376,508.

(51) Int. Cl.
*A63F 13/792* (2014.01)
*G06Q 20/12* (2012.01)

(52) U.S. Cl.
CPC ......... *A63F 13/792* (2014.09); *G06Q 20/123* (2013.01)

(58) Field of Classification Search
CPC ............. A63F 13/792; A63F 2300/575; G06Q 20/123

See application file for complete search history.

(56) References Cited

U.S. PATENT DOCUMENTS

| | | | |
|---|---|---|---|
| 7,314,407 B1 | 1/2008 | Pearson | |
| 7,386,517 B1* | 6/2008 | Donner | G06Q 30/0277 705/72 |
| 8,523,648 B2 | 9/2013 | Gilson | |
| 9,406,058 B1* | 8/2016 | Rebeil | G01N 33/2028 |
| 10,664,863 B1* | 5/2020 | Mishra | G06Q 30/0251 |
| 10,946,291 B1 | 3/2021 | Harris | |
| 11,173,401 B1 | 11/2021 | Linden | |
| 11,247,127 B1 | 2/2022 | Linden | |
| 2002/0028710 A1 | 3/2002 | Ishihara | |

(Continued)

OTHER PUBLICATIONS

Roblox Blog, "The Gift of Roblox", Nov. 18, 2011, pp. 1-3, at https://blog.roblox.com/2011/11/the-gift-of-roblox (last visited Nov. 4, 2021). (Year: 2011) (Year: 2011).*

(Continued)

*Primary Examiner* — Steve Rowland
(74) *Attorney, Agent, or Firm* — Esplin & Associates, PC

(57) ABSTRACT

Systems and methods for enabling exchange of tradeable items are disclosed. Exemplary implementations may: receive the first tradeable item from a user; determine whether the received first tradeable item is a valid tradeable item within the online gaming platform by identifying the first tradeable item based on the first item-identifying information and by verifying the first tradeable item is a valid tradeable item within the online gaming platform; responsive to determining the received first tradeable item is valid within the online gaming platform, select a second tradeable item from a repository of tradeable items; and dispense, from the repository, the second tradeable item to the user.

10 Claims, 4 Drawing Sheets

(56) References Cited

U.S. PATENT DOCUMENTS

| | | |
|---|---|---|
| 2004/0166913 A1 | 8/2004 | Shinoda |
| 2005/0059483 A1 | 3/2005 | Borge |
| 2006/0015436 A1* | 1/2006 | Burns .................... G06Q 40/04 705/37 |
| 2006/0068860 A1 | 3/2006 | Ueshima |
| 2006/0089897 A1* | 4/2006 | Maas ..................... G06Q 40/04 705/37 |
| 2007/0202952 A1 | 8/2007 | Francis |
| 2007/0211047 A1 | 9/2007 | Doan |
| 2010/0029380 A1 | 2/2010 | Rhoads |
| 2010/0169231 A1* | 7/2010 | Bowles ............. G06Q 30/0237 705/308 |
| 2010/0229106 A1 | 9/2010 | Lee |
| 2012/0109787 A1* | 5/2012 | Larrick ............. G06Q 30/0237 705/27.1 |
| 2014/0333025 A1 | 11/2014 | Amireh |
| 2016/0287998 A1 | 10/2016 | Kawanabe |
| 2018/0043259 A1 | 2/2018 | Wong |
| 2021/0387093 A1 | 12/2021 | Linden |
| 2022/0105434 A1 | 4/2022 | Linden |

OTHER PUBLICATIONS

Roblox Blog, "The Gift of Roblox", Nov. 18, 2011, pp. 1-3, at https://blog.roblox.com/2011/11/the-gift-of-roblox (last visited Nov. 4, 2021) (Year: 2011).

* cited by examiner

SYSTEMS AND METHODS FOR ENABLING EXCHANGE OF TRADEABLE ITEMS

FIELD OF THE DISCLOSURE

The present disclosure relates to systems and methods for enabling the physical exchange of tradeable items.

BACKGROUND

Gaming platforms often implement various techniques to keep users engaged. Various techniques may include purchasing of items associated with the gaming platform, collaborative play, providing incentives, and/or other techniques.

SUMMARY

One aspect of the present disclosure relates to a physical device that may accept a tradeable item and dispense a different tradeable item to facilitate exchange and circulation of tradeable items amongst users associated with a gaming platform. The device may accept the tradeable item from a user via a receptacle and determine whether the acceptable tradeable item is valid within the gaming platform. Upon determination of validity, the device may select the different tradeable item from a repository of various tradeable items of the device and dispense the different tradeable item to the user. In some implementations, rather than exchanging the tradeable item for the different tradeable item, the user may purchase the different tradeable item. In some implementations, the selection of the different tradeable item may be based on user input from the user, a randomized selection, first-in first-out selection, last-in first-out selection, and/or other selection methods. Upon receipt of the tradeable item from the user, any previously-made modifications performed upon game assets (within the gaming platform) in accordance with the tradeable item may be adjusted. In some implementations, the device may be a battery-operated desk device.

One aspect of the present disclosure relates to an item dispensing device configured to exchange of tradeable items between users of an online gaming platform. The device may include one or more of a repository, an item receptacle, a dispenser, hardware processors configured by machine-readable instructions. The machine-readable instructions may include computer components, and/or other components. The computer components and/or other components may include one or more of item validity component, item selector, dispenser controller, and/or components.

The repository may store tradeable items. Individual tradeable items may be identified by item-identifying information. The individual tradeable items may be real-world physical items including a first tradeable item. The individual tradeable items may be connected with one or more user accounts of an online gaming platform. The one or more user accounts may be associated with one or more users and/or one or more game assets included in the one or more user accounts.

The item receptacle may be configured to receive the first tradeable item from a user. The first tradeable item may include first item-identifying information that identifies the first tradeable item.

The item validity component may be configured to determine whether the received first tradeable item is a valid tradeable item within the online gaming platform. The item validity component may be configured to identify the first tradeable item based on the first item-identifying information. The item validity component may be configured to verify the first tradeable item is a valid tradeable item within the online gaming platform.

The item selector may be configured to select a second tradeable item from a repository of tradeable items. The selection of the second tradeable item may be responsive to determining the received first tradeable item is valid within the online gaming platform.

The dispenser controller may be configured to control the dispenser to dispense, from the repository, the second tradeable item to the user. Controlling the dispenser may be responsive to selecting the second tradeable item.

Another aspect of the present disclosure relates to a system configured to facilitate modifying game assets based on exchanged tradeable items via the item-dispensing devices. The system may include one or more hardware processors configured by machine-readable instructions. The machine-readable instructions may include computer components. The computer components may include one or more of an interface component, recordation component, modifying component, and/or other components.

The interface component may be configured to facilitate wireless communication sessions with individual item dispensing devices. The wireless communication may facilitate communication of exchange information to the recordation component and/or other components. The exchange information may indicate whether the first user exchanged the first tradeable item for a second tradeable item dispensed by a particular item dispensing device. The exchange information may include receipt of the first tradeable item, the dispensing of the second tradeable item from the particular item dispensing device to the first user, and/or other information pertaining to exchanges of tradeable items.

The recordation component may be configured to obtain the exchange information from the item dispensing devices during the wireless communication sessions with the individual item dispensing devices. The second tradeable item may be dispensed in response to receiving the first tradeable item and verifying the first tradeable item is a valid tradeable item. The recordation component may be configured to record, within the online gaming platform, that the first tradeable item has been received.

The modifying component may be configured to adjust modifications performed upon the one or more game assets that were previously modified in accordance with the received first tradeable item. The adjustment of the modifications may be responsive to recording the received first tradeable item.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
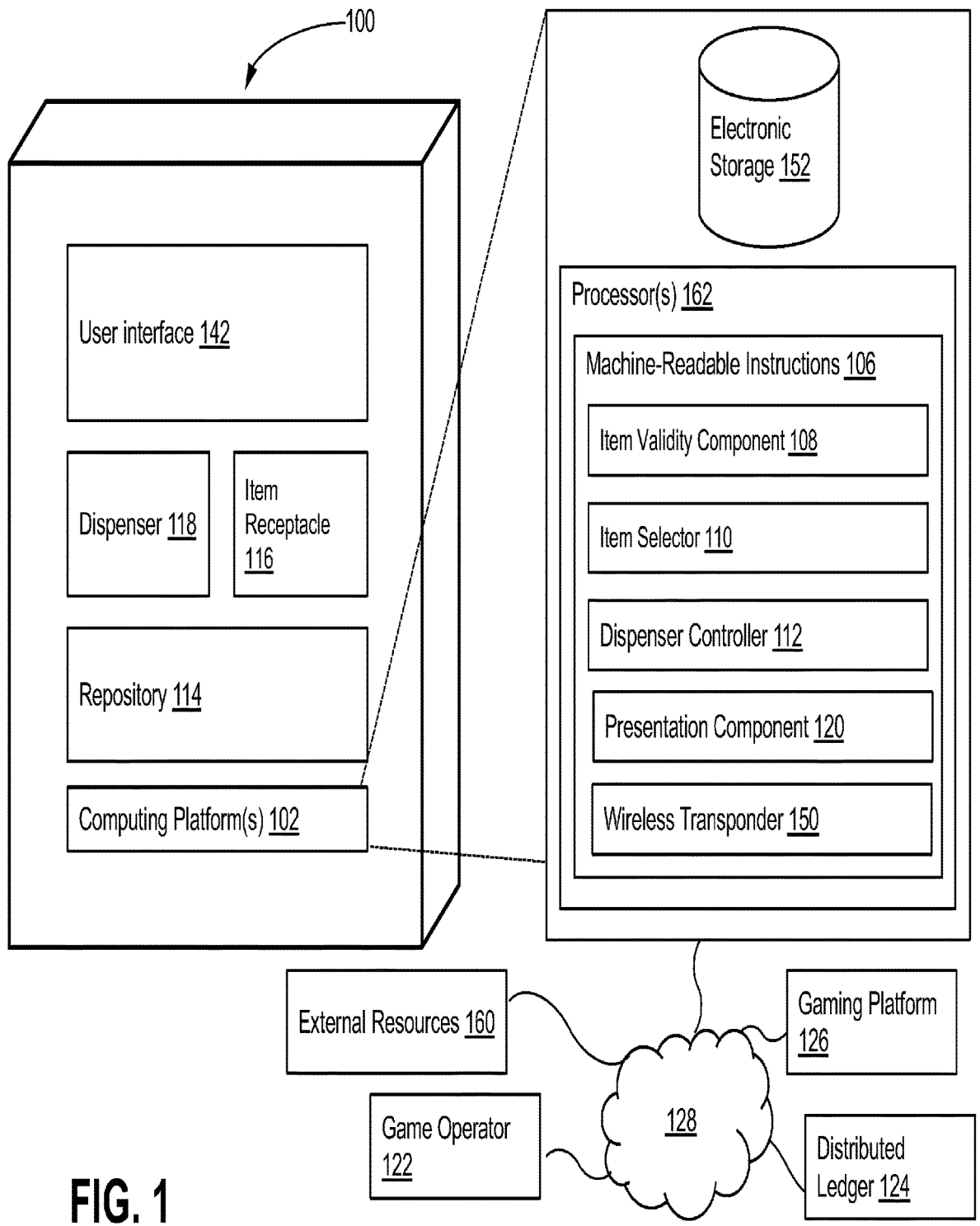
FIG. 1 illustrates a system configured for enabling exchange of tradeable items, in accordance with one or more implementations.

FIG. 1 illustrates an item dispensing device 100 configured to enable exchange of tradeable items, in accordance with one or more implementations. In some implementations, item dispensing device 100 may include one or more repository 114, item receptacle 116, dispenser 118, computing platform (s) 102, and/or user interface 142.

In some implementations, item dispensing device 100 and/or computing platform(s) 102 may be configured to communicate with one or more of (online) gaming platform(s) 126, game operator(s) 122, distributed ledger 124, and/or other components via one or more network(s) 128. As used herein, gaming platform 126 may refer to either an individual game, a type of gaming console and its ecosystem, and/or any combination of these. Gaming platform 126 may include one or more (online) games. Game operator 122 may refer to a host, operator, owner, and/or other stakeholder of gaming platform 126.

In some implementations, distributed ledger 124 (e.g., a blockchain or another structure of blocks) may be maintained by a distributed computing platform (not shown in FIG. 1). In some implementations, the distributed computing platform may be implemented by a set of client computing platforms and/or computing platforms. The distributed computing platform may support a virtual machine (not shown in FIG. 1). The distributed computing platform and/or the virtual machine may form a runtime environment for smart contracts. In some implementations, the distributed computing platform may include electronic storage configured to store part or all of distributed ledger(s) 124. The smart contracts may be stored on distributed ledger(s) 124. In some implementations, the distributed computing platform may be Ethereum. In some implementations, the distributed computing platform may be the EOSIO platform. In some implementations, the virtual machine may be a Turing-complete and decentralized virtual machine.

Distributed ledger(s) 124 may act as a decentralized database that stores a registry of assets and transactions across one or more networks 128. A given asset may be owned by a particular user. An asset may include anything of material value or usefulness that is owned by or on behalf of a person or company, according to some implementations. A right pertaining to an object may be an asset, the object being a physical or a virtual item. Multiple rights may form a set of rights or a bundle of rights that may be transferred and/or otherwise acted on or operated on together. For example, rights may include a right to use, a right to sell, a right to destroy, and/or other rights.

In some implementations, distributed ledger(s) 124 may record ownership of assets. Alternatively, and/or simultaneously, distributed ledger(s) 124 may record transactions that modify ownership of assets. A smart contract may be a type of asset. In some implementations, once a smart contract has been added to the distributed ledger, the smart contract may be referred to as published, recorded, and/or posted. Elements of distributed ledger(s) 124 may be grouped together in units that are referred to as blocks. For example, an individual block may include one or more assets and one or more transactions.

Distributed ledger(s) 124 may be publicly accessible and append-only. In some implementations, existing blocks of a distributed ledger can substantially not be altered or deleted, unless multiple copies of the distributed ledger are altered. This is unlikely to happen provided that multiple copies of the distributed ledger are stored on different computing platforms, e.g., in different geographical locations. The distributed ledger may be replicated (in part or in its entirety) on multiple computing platforms, preferably in multiple different geographical locations.

Repository 114 may be configured to store tradeable items. Individual tradeable items may be real-world physical items. By way of non-limiting example, the individual tradeable items may include a coin, a playing card, a toy, a figurine, and/or other real-world physical items. The individual tradeable items may be identified by item-identifying information. The item-identifying information may distinguish the tradeable items from each other. In some implementations, the individual tradeable items may include a physical manifestation of an item identifier that is associated with the item-identifying information. The item identifiers may include a barcode, a QR code, radio frequency identifier (RFID), serial number, and/or other human-readable or machine-readable identifiers. In some implementations, individual tradeable items may be identified using Near-Field Communication (NFC) technology. For example, an NFC-enabled coin may be traded using item dispensing device 100 such that the item-identifying information is exchanged through NFC technology. The tradeable items stored in repository 114 may include a second tradeable item (i.e., an outgoing tradeable item) such that the second tradeable item is identified by second item-identifying information.

Gaming platform 126 may include one or more user accounts associated with one or more users. For example, the users may include a first user, a second user, a third user, and so forth. The individual tradeable items may be connected with the one or more user accounts of online gaming platform 126. The one or more user accounts may be associated with one or more users and/or one or more game assets included in the one or more user accounts. The game assets may be (collections and/or packages of) virtual items usable within an online gaming platform, such as gaming platform 126. By way of non-limiting example, the game assets may include one or more of a weapon, character, tool, pet, clothing, vehicle, level, mission, assignment, chapter, task, mini-game, and/or other virtual items. Game assets may be usable within gaming platform 126 by an owner of a right to usage within gaming platform 126. The owner of a first particular game asset may be a first user, the owner of a second particular game asset may be a second user, and so forth.

The individual tradeable items may be associated with individual item information. The item information may include modification information that is usable to modify attribute information of one or more individual game assets. The modification information may include, for example, a set of code that, upon execution, modifies individual game assets, asset information, attribute information, and/or other information related to individual game assets. The individual game assets may be defined by asset information. In some implementations, asset information may include one or more of the attribute information, a set of rules, and/or other information. In some implementations, attribute information may define one or more of a type of game asset, uses, impacts, aesthetics, and/or other attributes of the individual game assets. The attribute information of the individual game assets may be within at least one of the one or more (online) games. The set of rules may pertain to the individual game assets simultaneously being modified by more than one of the modification information of more than one of the individual tradeable items. The set of rules may include a maximum value of tradeable items that can modify the individual game asset simultaneously, one or more types of tradeable item the individual game asset can be modified by, and/or other rules. The individual user accounts may include individual inventories of one or more game assets. The one or more game assets of the individual inventories may be game assets that the user account, or the user, owns, won, leases, found, stole, and/or otherwise possesses.

Item receptacle 116 may be configured to receive the tradeable items from one or more users. Item receptacle 116 may be configured to hold and/or store the received tradeable items in repository 114. The received tradeable items may include the first tradeable item (i.e., an incoming tradeable item) from a user. The first tradeable item may include first item-identifying information that identifies the first tradeable item. Item receptable 116 may include one or more of grab claws, magnets, suction cups, rods, platforms, platform doors, and/or other components where an item may be entered and "grabbed" or otherwise physically selected and/or moved to receive the item.

Dispenser 118 may be configured to dispense the individual tradeable items from repository 114 to one or more users. In some implementations, dispensing of individual tradeable items may be in response to receiving one of the tradeable items from the one or more users via item receptacle 116. In some implementations, dispensing of individual tradeable items may be in response to purchasing one of the tradeable items in repository 114. Dispenser 118 may include one or more of grab claws, magnets, suction cups, rods, platforms, platform doors, and/or other components. In some implementations, dispenser 118 may be configured to dispense, "grab" or otherwise physically select and/or move the individual tradeable items to a platform to dispense to the one or more users where the one or more users may have access to obtain the individual tradeable items.

In some implementations, dispenser 118 may be configured to dispense the second tradeable item (i.e., the outgoing tradeable item) from repository 114. Dispensing of the second tradeable item may be in response to receiving the first tradeable item (i.e., the incoming tradeable item) from the user via item receptacle 116.

Computing platform(s) 102 may be configured by machine-readable instructions 106. Machine-readable instructions 106 may include one or more instruction components. The instruction components may include computer program components. In some implementations, the instruction components may include one or more of item validity component 108, item selector 110, dispenser controller 112, presentation component 120, wireless transponder 150, and/or other instruction components. Upon configuration of computing platform (s) 102 by machine-readable instructions 106, functionality of computing platform(s) 102 may be improved such that computing platform (s) 102 serve to establish and/or improve a computer-automated process more capable than a generic computer.

Item validity component 108 may be configured to determine whether the received tradeable items are valid tradeable items within online gaming platform 126. In some implementations, item receptacle 116 may include one or more camera-based sensor, a magnetic sensor, an optical sensor, and/or other sensors to capture an image of an item identifier in order to obtain the item-identifying information of a particular tradeable item by the item identifier. The obtained item-identifying information may be communicated with item validity component 108 and/or otherwise processed by item dispensing device 100.

In some implementations, item validity component 108 may determine whether the received first tradeable item is a valid tradeable item within online gaming platform 126. Determination of validity may include identifying the first tradeable item by the first item-identifying information and verifying the first tradeable item is a valid tradeable item within online gaming platform 126. The tradeable items officially associated with online gaming platform 126 may be determined as valid tradeable items within online gaming platform 126. By way of non-limiting example, the first tradeable item may be determined valid while an arbitrary pencil may not be associated with online gaming platform 126 and thus determined invalid. Determination of validity may be performed subsequent to receiving an item (e.g., the first tradeable item, the pencil, etc.) and prior to dispensing the second tradeable item and/or an arbitrary tradeable item from repository 114.

In some implementations, upon the received item being determined as invalid (e.g., the pencil), the received item may be dispensed back to the user (i.e., returned) via dispenser 118.

Item selector 110 may be configured to select one of the tradeable items from repository 114. Selection of the one of the tradeable items may be responsive to determining the received tradeable item is valid within online gaming platform 126 or responsive to purchasing of the one of the tradeable items. In some implementations, item selector 110 may select the second tradeable item from the tradeable items in repository 114. Selection of the second tradeable item may be responsive to determining the received first tradeable item is valid within online gaming platform 126. In some implementations, selection of the second tradeable item may include randomized selection from the tradeable items of repository 114, first-in first-out selection from the tradeable items of repository 114, last-in first-out selection from the tradeable items of repository 114, a particular selection of a tradeable item selected by the user, and/or other based on other selection methods.

Dispenser controller 112 may be configured to control dispenser 118 to dispense tradeable items from repository 114. In some implementations, dispensed tradeable items may be selected by item selector 110. In some implementations, dispenser controller 112 may control dispenser 118 to dispense the second tradeable item from repository 114 to the user.

In some implementations, item dispensing device 100 may include user interface 142. In some implementations, user interface 142 may include one or more controllers, joysticks, track pad, a touch screen, a keypad, touch sensitive and/or physical buttons, switches, a keyboard, knobs, levers, a display, speakers, a microphone, an indicator light, a printer, and/or other interface devices. User interface 142 may be configured to receive user input from users. The receive user input may provide interaction between device 100 and the users. In some implementations, received user input may, e.g., be used to select a tradeable item as described in relation to item selector 110.

Presentation component 120 may be configured to present to the one or more users the one of the tradeable items that may be dispensed, item-identifying information that indicates the one of the tradeable items, exchange options, and/or other information. Presentation may be via user interface 142. Presentation may be responsive to determining the received tradeable item is valid within online gaming platform 126. In some implementations, upon determining the received tradeable item is invalid within online gaming platform 126, presentation component 120 may present a message, symbol, sound, and/or other notification indicating to the user that the received tradeable item is invalid and cannot be exchanged for another tradeable item. In some implementations, the exchange options presented to the user may allow the one or more users to select whether the one of the tradeable items is dispensed to the one or more users.

In some implementations, presentation component 120 may visually present the second tradeable item, the second item-identifying information, the exchange options, and/or other information. Presentation may be responsive to determining the received first tradeable item is valid. The exchange options presented to the user may allow the user to select whether the second tradeable item is dispensed to the user and thus exchanged for the first tradeable item. The exchange options may include acceptance of a particular exchange of the first tradeable item with the second tradeable item, denial of the particular exchange of the first tradeable item with the second tradeable item, and/or other options pertaining to exchanges of tradeable items.

In some implementations, item selector 110 may be configured to receive the selection of one of the exchange options from the user, e.g., through user interface 142. In some implementations, the dispensing of the second tradeable item to the user may be responsive to receiving user input that represents the acceptance of the exchange of the first tradeable item with the second tradeable item. Thus, dispenser controller 112 may control dispenser 118 to dispense the second tradeable item.

In some implementations, item selector 110 may receive the user input where the user input represents denial of the exchange (i.e., the user does not want to proceed with exchanging the first tradeable item for the second tradeable item). In such instances, the first tradeable item may be selected by item selector 110 and dispenser controller 112 may control dispenser 118 to dispense the first tradeable item back to the user.

In some implementations, the one or more users may purchase one or more of the tradeable items from item dispensing device(s) 100. Selection of a purchased one or more of the tradeable items may be randomized selection from the tradeable items of repository 114, first-in first-out selection from the tradeable items of repository 114, last-in first-out selection from the tradeable items of repository 114, user selection of a particular tradeable item, and/or based on other selection methods.

In some implementations, presentation component 120 may be configured to present to the one or more users the tradeable items of repository 114 so that the one or more users may browse and select the tradeable item the individual users desire. Browsing the tradeable items of repository 114 may be supported via user interface 142. In some implementations, the tradeable items of repository 114 of individual item dispensing device(s) 100 may include a subset of tradeable items of which the one or more users may desire. Desire for a particular tradeable item may be based on the attribute information of the individual game assets, modification information of the individual tradeable items, how the modification information of the individual tradeable items may affect the attribute information of the individual game assets, and/or other desirable factors. In some implementations, the one or more users may browse the tradeable items of repository 114, but selection of which tradeable item is dispense is randomized selection from the tradeable items of repository 114, first-in first-out selection from the tradeable items of repository 114, and/or last-in first-out selection from the tradeable items of repository 114. Thus, in some implementations, the one or more users may take their chances on being dispensed their desired tradeable item or another tradeable item.

In some implementations, presentation component 120 may be configured to present a preview to users, via user interface 142, of the effect of modifications upon a particular game asset in accordance with the individual tradeable items prior to accepting a particular exchange.

Figure 4:
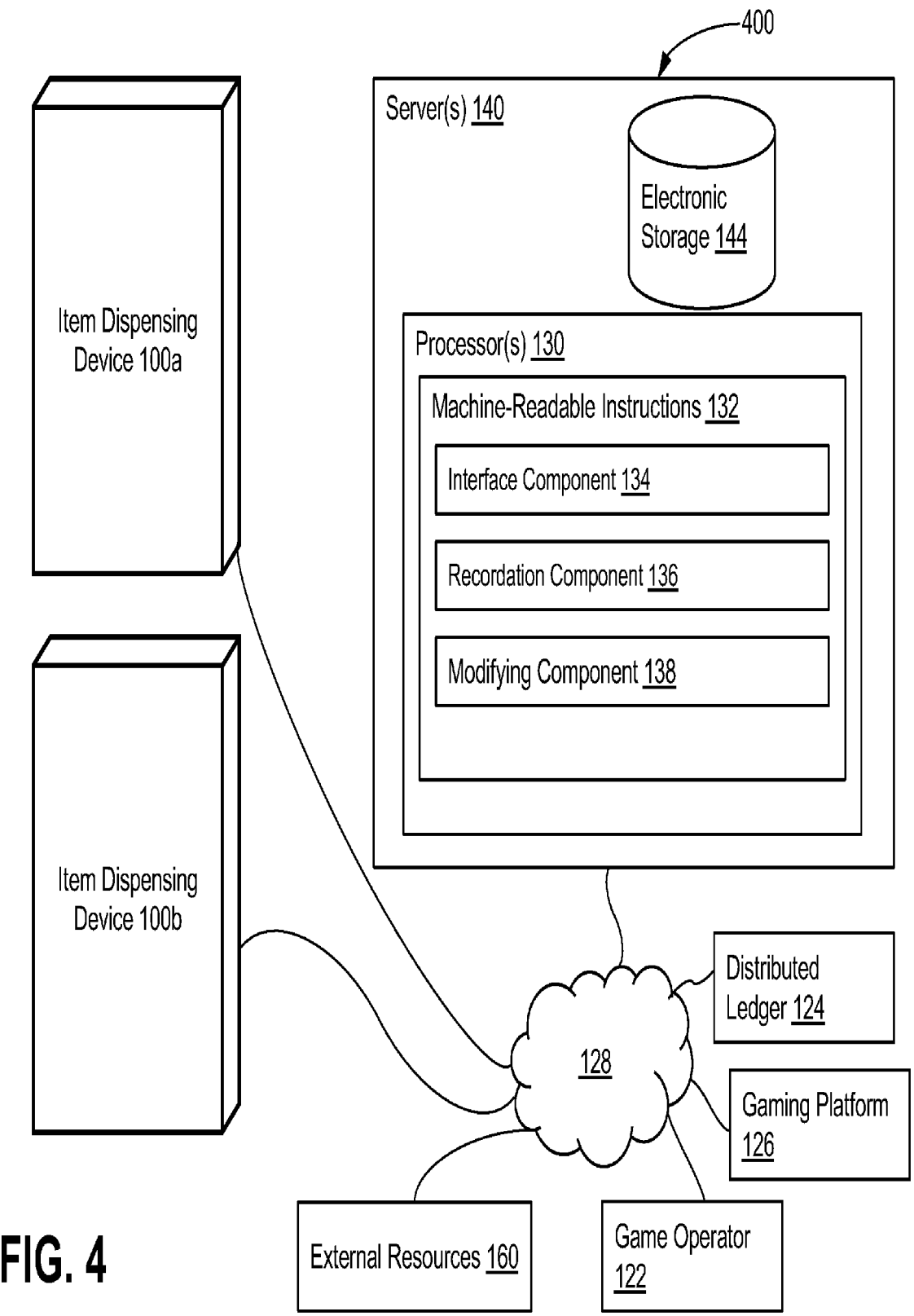
FIG. 4 illustrates a system configured to facilitate modifying game assets based on exchanged tradeable items via item dispensing devices, in accordance with one or more implementations.

In some implementations, wireless transponder 150 may be configured to wirelessly communicate exchange information to one or more exchange controlling processors (e.g., processor(s) 130 of FIG. 4). The exchange information may indicate whether the first tradeable item (i.e., the incoming tradeable item) has been exchanged for the second tradeable item (i.e., the outgoing tradeable item) dispensed from repository 114. The exchange information may include, e.g., receipt of the first tradeable item and the dispensing of the second tradeable item from repository 114. The exchange information may be communicated with the one or more exchange controlling processors so that the exchange information may be recorded to distributed ledger 124, storage on the one or more exchange controlling processors, databases stored in storage on the one or more exchange controlling processors, within online gaming platform 126, and/or other recordation locations. In particular, the receipt of the first tradeable item may be recorded to e.g., distributed ledger 124. Thus, the communication of the exchange information and/or the recordation of the exchange information to distributed ledger 124 may effectuate modification adjustments upon the one or more game assets modified in accordance with the first tradeable item, if any. The effectuation of the modification adjustments may be performed by the one or more exchange controlling processors. Modification adjustments may include ceasing the modification in accordance with the first tradeable item, reducing the modification (e.g., reducing a magnitude of one or more impacts, removing a use), enhancing the modification (e.g., increasing a magnitude of one or more impacts, adding a use), and/or other adjustments.

In some implementations, wireless transponder 150 may communicate the exchange information to distributed ledger 124, storage on the one or more exchange controlling processors, databases stored in storage on the one or more exchange controlling processors, within online gaming platform 126, and/or one or more other distributed ledgers directly.

FIG. 4 illustrates dispense device controller 400 configured to facilitate modifying game assets based on exchanged tradeable items via item dispensing device 100a and item dispensing device 100b, in accordance with one or more implementations. In some implementations, dispense device controller 400 may include one or more computing platform(s) 140. The processor(s) 130 of computing platform(s) 140 may be the same as or similar to the one or more exchange controlling processors described above. Item dispensing devices 100a and 100b may be the same as or similar to item dispensing device 100 as previously described above.

In some implementations, dispense device controller 400 and/or computing platform(s) 140 may be configured to communicate with one or more of (online) gaming platform(s) 126, game operator(s) 122, distributed ledger 124, and/or other components via one or more network(s) 128.

Computing platform(s) 140 may be configured by machine-readable instructions 132. Machine-readable instructions 132 may include one or more instruction components. The instruction components may include computer program components. The instruction components may include one or more of interface component 134, recordation component 136, modifying component 138, and/or other instruction components. As previously described, item dispensing device(s) 100 may dispense tradeable items that are real-world physical items. Upon configuration of computing platform(s) 140 by machine-readable instructions 132, functionality of computing platform(s) 140 may be improved such that computing platform(s) 140 serve to establish and/or improve a computer-automated process more capable than a generic computer.

Interface component 134 may be configured to facilitate wireless communication with individual item dispensing device(s) 100a and 100b. Wireless communication with individual item dispensing device(s) 100a and 100b may be via one or more networks 128. The wireless communication with individual item dispensing device(s) 100a and 100b may facilitate communication of exchange information to computing platform(s) 140. Subsequently, computing platform(s) 140 may record the exchange information and/or adjust previous modifications performed upon one or more game assets that are modified in accordance with the received tradeable item.

Recordation component 136 may be configured to obtain exchange information from item dispensing device(s) 100a and 100b during the wireless communication sessions with the item dispensing device(s) 100a and 100b. As previously described, the exchange information may indicate whether the one or more users have exchanged the received tradeable item for the tradeable item dispensed by a particular item dispensing device 100. The exchange information may include the receipt of the received tradeable item, the dispensing of the one of the one or more tradeable items from repository 114 from the particular item dispensing device to the one or more users, and/or other information pertaining to exchanges of tradeable items. The dispensing may be in response to receiving the received tradeable item and verifying the received tradeable item is a valid tradeable item within online gaming platform 126, receiving the user input indicating acceptance of the exchange, and/or the user purchasing the one of the tradeable items from a particular item dispensing device 100.

In some implementations, the exchange information may indicate whether the first user exchanged the first tradeable item for the second tradeable item dispensed by item dispensing device 100a. The exchange information may include, e.g., the receipt of the first tradeable item and the dispensing of the second tradeable item from item dispensing device 100a to the first user. The second tradeable item may be dispensed in response to receiving the first tradeable item and verifying the first tradeable item is a valid tradeable item.

Recordation component 136 may be configured to record exchange information of the tradeable items. Recording the exchange information may include recording receipt of the first tradeable item, the dispensing of the second tradeable item, and/or other information pertaining to exchanges of tradeable items. In some implementations, recording the exchange information may include recording to distributed ledger 124, database(s) stored in electronic storage 144, within online gaming platform 126, and/or one or more other distributed ledgers.

Modifying component 138 may be configured to adjust modifications performed upon the one or more game assets that are modified in accordance with the received tradeable item. In instances where there are no game assets modification in accordance with the received tradeable item, no adjustments of modifications may be performed. In some implementations, modifying component 138 may adjust modifications performed upon the one or more game assets that are modified in accordance with the received first tradeable item. Adjustments of modifications may be responsive to receiving the received first tradeable item, recording the received first tradeable item, or both.

Figure 3A:
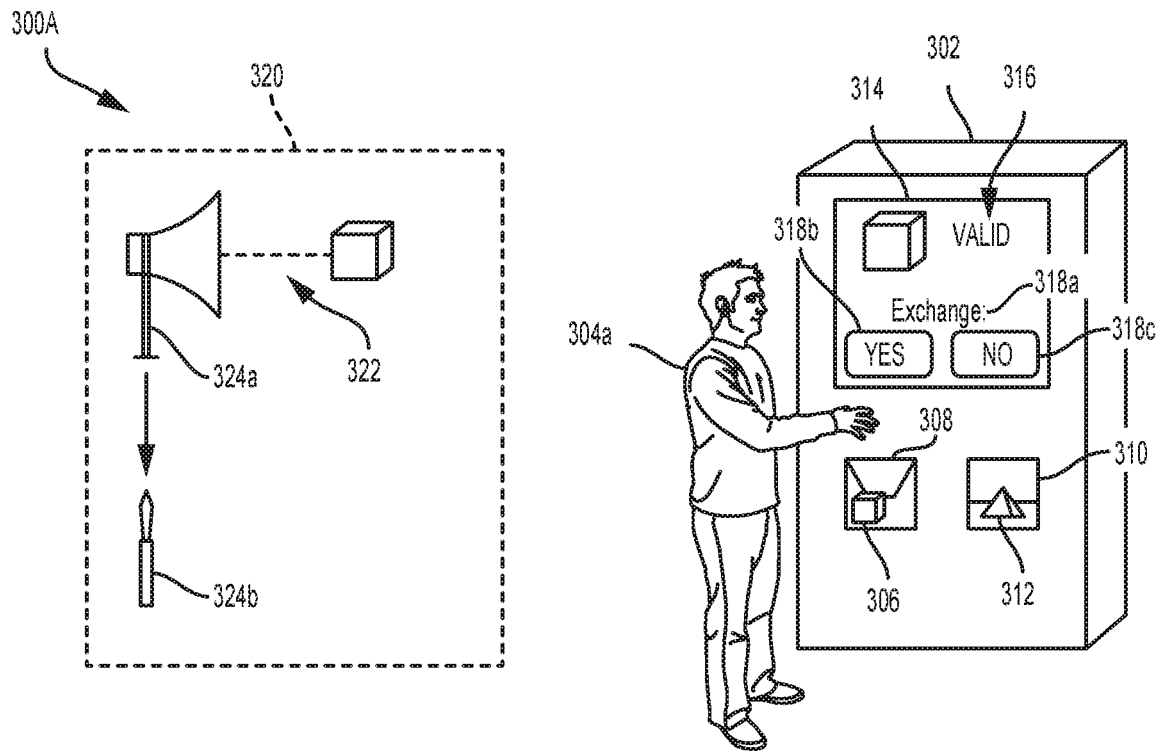
FIG. 3A illustrates an example implementation of a system configured for enabling exchange of tradeable items, in accordance with one or more implementations.

FIG. 3A illustrates an example implementation of a system (similar to item dispensing device 100 in FIG. 1) configured for enabling exchange of tradeable items, in accordance with one or more implementations. The size of device 302 as depicted is merely exemplary and not intended to be limiting in any way. FIG. 3A illustrates scenario 300A that includes device 302 (i.e., item dispensing device) and user 304a. Device 302 may include user interface 314, receptacle 308, dispenser 310, and/or other components. User 304a may be in possession of an item 306. A connection 322 may be recorded between user 304a's game asset 324a and item 306 within a gaming platform 320. User 304a may deposit item 306 into receptacle 308. One or more computing platform(s) (not pictured) of device 302 (i.e., the same as or similar to computing platform(s) 102 in FIG. 1) may validate item 306 and display a validation 316 via user interface 314 for user 304a to view. Validation 316 may indicate to user 304a that received item 306 is valid within gaming platform 320 and an exchange of item 306 with another item is permitted. User 304a may be presented exchange options 318a. Exchange options 318a may include an accept option 318b (i.e., proceed to exchange item 306 for another item) and a deny option 318c (i.e., do not proceed to exchange item for another item). Upon user 304a selecting accept option 318b, an item 312 may be selected and dispensed via dispenser 310. In some implementations, upon user 304a selecting accept option 318b, modifications performed upon game asset 324a in accordance with item 306 may be adjusted such that game asset 324a may be adjusted to game asset 324b within gaming platform 320.

Figure 3B:
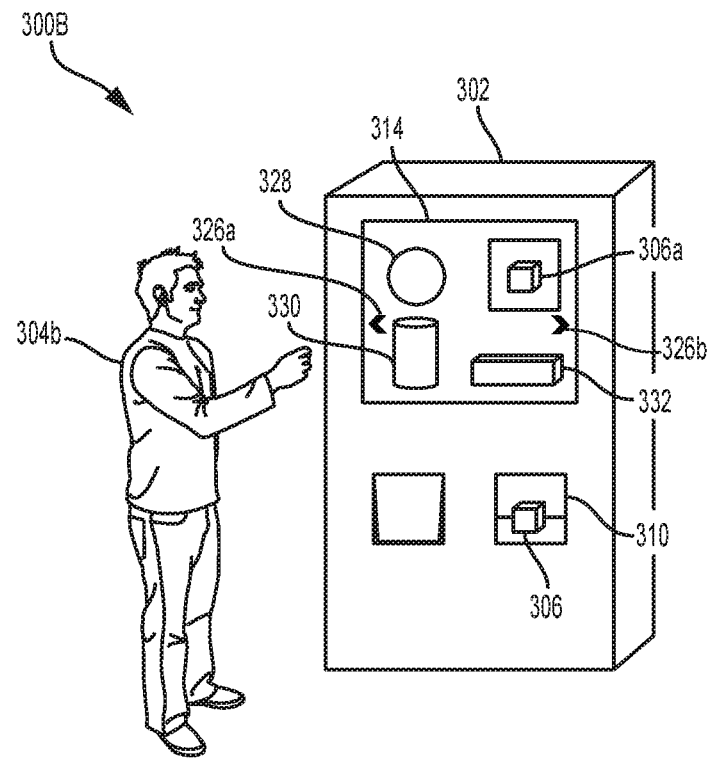
FIG. 3B illustrates an example implementation of a system configured for enabling exchange of tradeable items, in accordance with one or more implementations.

FIG. 3B illustrates an example implementation of a system configured for enabling exchange of tradeable items, in accordance with one or more implementations. FIG. 3B illustrates scenario 300B that includes device 302 (i.e., item dispensing device) and user 304b. The size of device 302 as depicted is merely exemplary and not intended to be limiting in any way. User 304b may interface with device 302 immediately subsequent to user 304a interfacing with device 302. User 304b may desire to purchase a tradeable item from device 302. User 304b may browse through tradeable item images that represent tradeable items within a repository (not pictured) of device 302 via a user interface 314 and paging buttons 326a and 326b. User 304b may view tradeable item images 306a, 328, 330, and 332. User 304b may select item image 306a to purchase. Upon selection, item 306 may be selected and dispense via dispenser 310 to user 304b. Item 306 may be the same item that user 304a exchanged just prior to user 304b's purchase.

Referring to FIG. 1, in some implementations, computing platform(s) 102, and/or external resources 160 may be operatively linked via one or more electronic communication links. For example, such electronic communication links may be established, at least in part, via one or more networks 128 such as the Internet and/or other networks. It will be appreciated that this is not intended to be limiting, and that the scope of this disclosure includes implementations in which computing platform(s) 102, and/or external resources 160 may be operatively linked via some other communication media.

By way of non-limiting example, item dispensing device 100 may include one or more of a desktop computer, a laptop computer, a handheld computer, a tablet computing platform, a NetBook, a Smartphone, a gaming console, and/or other computing platforms.

External resources 160 may include sources of information outside of item dispensing device 100, external entities participating with item dispensing device 100, and/or other resources. In some implementations, some or all of the functionality attributed herein to external resources 160 may be provided by resources included in item dispensing device 100.

Computing platform(s) 102 may include electronic storage 152, one or more processors 162, and/or other components. Computing platform(s) 102 may include communication lines, or ports to enable the exchange of information with a network and/or other computing platforms. Illustration of computing platform(s) 102 in FIG. 1 is not intended to be limiting. Computing platform(s) 102 may include a plurality of hardware, software, and/or firmware components operating together to provide the functionality attributed herein to computing platform(s) 102. For example, computing platform(s) 102 may be implemented by a cloud of computing platforms operating together as computing platform(s) 102.

Electronic storage 152 may comprise non-transitory storage media that electronically stores information. The electronic storage media of electronic storage 152 may include one or both of system storage that is provided integrally (i.e., substantially non-removable) with computing platform(s) 102 and/or removable storage that is removably communicable with computing platform(s) 102 via, for example, a port (e.g., a USB port, a firewire port, etc.) or a drive (e.g., a disk drive, etc.). Electronic storage 152 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 152 may include one or more virtual storage resources (e.g., cloud storage, a virtual private network, and/or other virtual storage resources). Electronic storage 152 may store software algorithms, information determined by processor(s) 162, information received from computing platform(s) 102, and/or other information that enables computing platform(s) 102 to function as described herein.

Processor(s) 162 may be configured to provide information processing capabilities in computing platform(s) 102. As such, processor(s) 162 may include one or more of a digital processor, an analog processor, a digital circuit designed to process information, an analog circuit designed to process information, a state machine, and/or other mechanisms for electronically processing information. These mechanisms for electronically processing information that may serve as processor(s) 162 may transforms and/or improve computing platform(s) 102 such that computing platform(s) 102 function to accomplish a specific purpose. Although processor(s) 162 is shown in FIG. 1 as a single entity, this is for illustrative purposes only. In some implementations, processor(s) 162 may include a plurality of processing units. These processing units may be physically located within the same device, or processor(s) 162 may represent processing functionality of a plurality of devices operating in coordination. Processor(s) 162 may be configured to execute components 108, 110, 112, 120, and/or 150, and/or other components. Processor(s) 162 may be configured to execute components 108, 110, 112, 120, and/or 150, and/or other components by software; hardware; firmware; some combination of software, hardware, and/or firmware; and/or other mechanisms for configuring processing capabilities on processor(s) 162. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 120, and/or 150 are illustrated in FIG. 1 as being implemented within a single processing unit, in implementations in which processor(s) 162 includes multiple processing units, one or more of components 108, 110, 112, 120, and/or 150 may be implemented remotely from the other components. The description of the functionality provided by the different components 108, 110, 112, 120, and/or 150 described below is for illustrative purposes, and is not intended to be limiting, as any of components 108, 110, 112, 120, and/or 150 may provide more or less functionality than is described. For example, one or more of components 108, 110, 112, 120, and/or 150 may be eliminated, and some or all of its functionality may be provided by other ones of components 108, 110, 112, 120, and/or 150. As another example, processor(s) 162 may be configured to execute one or more additional components that may perform some or all of the functionality attributed below to one of components 108, 110, 112, 120, and/or 150.

In some implementations, computing platform(s) 140, item dispensing device(s) 100a and/or 100b, game operator 122, distributed ledger 124, gaming platform 126, and/or external resources 160 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 140, item dispensing device(s) 100a and/or 100b, game operator 122, distributed ledger 124, gaming platform 126, and/or external resources 160 may be operatively linked via some other communication media.

Computing platform(s) 140 may include electronic storage 144, one or more processors 130, and/or other components. Computing platform(s) 140 may include communication lines, or ports to enable the exchange of information with a network and/or other computing platforms. Illustration of computing platform(s) 140 in FIG. 4 is not intended to be limiting. Computing platform(s) 140 may include a plurality of hardware, software, and/or firmware components operating together to provide the functionality attributed herein to computing platform(s) 140. For example, computing platform(s) 140 may be implemented by a cloud of computing platforms operating together as computing platform(s) 140.

Electronic storage 144 may comprise non-transitory storage media that electronically stores information. The electronic storage media of electronic storage 144 may include one or both of system storage that is provided integrally (i.e., substantially non-removable) with computing platform(s) 140 and/or removable storage that is removably communicable with computing platform(s) 140 via, for example, a port (e.g., a USB port, a firewire port, etc.) or a drive (e.g., a disk drive, etc.). Electronic storage 144 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 144 may include one or more virtual storage resources (e.g., cloud storage, a virtual private network, and/or other virtual storage resources). Electronic storage 144 may store software algorithms, information determined by processor(s) 130, information received from computing platform(s) 140, and/or other information that enables computing platform(s) 140 to function as described herein.

Processor(s) 130 may be configured to provide information processing capabilities in computing platform(s) 140. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 4 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 134, 136, and/or 138, and/or other components. Processor(s) 130 may be configured to execute components 134, 136, and/or 138, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 134, 136, and/or 138 are illustrated in FIG. 4 as being implemented within a single processing unit, in implementations in which processor(s) 130 includes multiple processing units, one or more of components 134, 136, and/or 138 may be implemented remotely from the other components. The description of the functionality provided by the different components 134, 136, and/or 138 described below is for illustrative purposes, and is not intended to be limiting, as any of components 134, 136, and/or 138 may provide more or less functionality than is described. For example, one or more of components 134, 136, and/or 138 may be eliminated, and some or all of its functionality may be provided by other ones of components 134, 136, and/or 138. As another example, processor(s) 130 may be configured to execute one or more additional components that may perform some or all of the functionality attributed below to one of components 134, 136, and/or 138.

Figure 2:
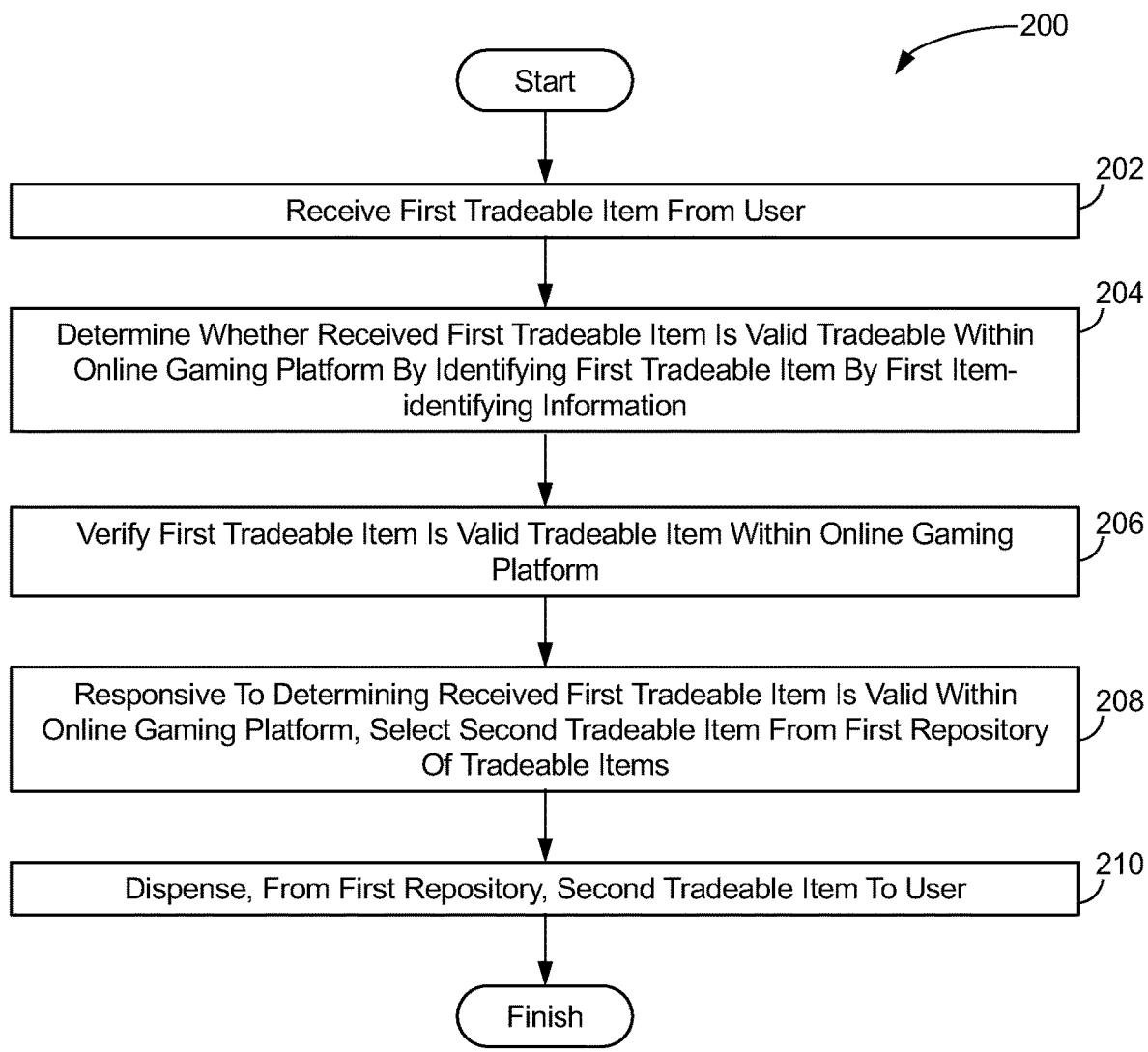
FIG. 2 illustrates a method for enabling exchange of tradeable items, in accordance with one or more implementations.

FIG. 2 illustrates a method 200 for enabling exchange of tradeable items, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include receiving the first tradeable item from a user. The first tradeable item may include first item-identifying information that identifies the first tradeable item. Operation 202 may be performed by a component that is the same as or similar to item receptacle 116, in accordance with one or more implementations.

An operation 204 may include determining whether the received first tradeable item is a valid tradeable item within an online gaming platform. Determination may include identifying the first tradeable item based on the first item-identifying information. Operation 206 may be performed by one or more hardware processors configured by machine-readable instructions including a component that is the same as or similar to item validity component 108, in accordance with one or more implementations.

An operation 206 may include verifying the first tradeable item is a valid tradeable item within the online gaming platform. The determination of whether the received first tradeable item is a valid tradeable item may include the verification. Operation 206 may be performed by one or more hardware processors configured by machine-readable instructions including a component that is the same as or similar to item validity component 108, in accordance with one or more implementations.

An operation 208 may include selecting a second tradeable item from a repository of tradeable items. Selection of the second tradeable item may be responsive to determining the received first tradeable item is valid within the online gaming platform. Operation 208 may be performed by one or more hardware processors configured by machine-readable instructions including a component that is the same as or similar to item selector 110 and repository 114, in accordance with one or more implementations.

An operation 210 may include dispensing, from the repository, the second tradeable item to the user. Operation 210 may be performed by one or more hardware processors configured by machine-readable instructions including a component that is the same as or similar to dispenser controller 112 and dispenser 118, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A method for exchanging tradeable items, wherein the individual tradeable items are real-world physical items including a first tradeable item, wherein the individual tradeable items are associated with one or more user accounts of an online gaming platform, wherein the one or more user accounts are associated with one or more users, the method comprising:
 receiving the first tradeable item from a user, wherein the first tradeable item is identified by first item-identifying information;
 determining whether the first tradeable item is a valid tradeable item within the online gaming platform by:
  (i) identifying the first tradeable item based on the first item-identifying information, and
  (ii) verifying the first item-identifying information corresponds to a particular valid tradeable item within the online gaming platform;
 responsive to determining the first tradeable item is valid within the online gaming platform, dispensing, from a repository of tradeable items, a second tradeable item to the user; and
 communicating, wirelessly via a wireless transponder, exchange information to one or more exchange controlling processors, wherein the exchange information indicates whether the first tradeable item has been exchanged for the second tradeable item, wherein the exchange information indicates receipt of the first tradeable item and dispensing of the second tradeable item from the repository.

2. The method of claim 1, further comprising:
 responsive to determining the first tradeable item is valid, presenting to the user, via a display:
  (i) the second tradeable item,
  (ii) second item-identifying information that identifies the second tradeable item, and
  (iii) exchange options, wherein the exchange options presented to the user allow the user to select whether the second tradeable item is dispensed to the user, wherein the exchange options include acceptance of an exchange of the first tradeable item with the second tradeable item and denial of the exchange of the first tradeable item with the second tradeable item; and
 receiving a particular selection of one or more of the exchange options from the user.

3. The method of claim 2, wherein the dispensing of the second tradeable item to the user is responsive to receiving user input that represents the acceptance of the exchange of the first tradeable item with the second tradeable item.

4. The method of claim 1, further comprising:
 selecting the second tradeable item from the repository, wherein a selection of the second tradeable item includes at least one of (i) randomized selection from the repository of tradeable items, (ii) first-in first-out selection from the repository of tradeable items, (iii) last-in first-out selection from the repository of tradeable items, and
 (iv) user selection from the repository of tradeable items.

5. An item dispensing device configured to exchange tradeable items between users of an online gaming platform, wherein the individual tradeable items are real-world physical items that are associated with one or more user accounts of the users of the online gaming platform, wherein the one or more user accounts are associated with one or more of the users, wherein the individual tradeable items are associated with one or more game assets and facilitate modifying the one or more game assets, the item dispensing device comprising:
 a repository configured to store tradeable items, wherein the tradeable items include an outgoing tradeable item, such that the outgoing tradeable item is identified by outgoing-item-identifying information;
 an item receptacle configured to receive other tradeable items from one or more users and store the other tradeable items in the repository such that an incoming tradeable item is received from a user and stored in the repository, wherein the incoming tradeable item is identified by incoming-item-identifying information;
 a dispenser configured to dispense individual tradeable items from the repository to the one or more users in response to receiving one of the other tradeable items from the one or more users via the item receptacle;
 one or more processors configured by machine-readable instructions to:
  determine whether the incoming tradeable item is a valid tradeable item within the online gaming platform by:
   (i) identifying the incoming tradeable item based on the incoming-item-identifying information; and
   (ii) verifying the incoming-item-identifying information corresponds to a particular valid tradeable item within the online gaming platform; and
  responsive to determining the incoming tradeable item is valid within the online gaming platform, control the dispenser to dispense the outgoing tradeable item to the user; and
 a wireless transponder configured to wirelessly communicate exchange information to one or more exchange controlling processors, wherein the exchange information indicates whether the incoming tradeable item has been exchanged for the outgoing tradeable item, wherein the exchange information indicates receipt of the incoming tradeable item and dispensing of the outgoing tradeable item from the repository.

6. The item dispensing device of claim 5, wherein the one or more processors are further configured by machine-readable instructions to:
 responsive to determining the first tradeable item is valid, present to the user, via a display:
  (i) the outgoing tradeable item,
  (ii) the outgoing-item-identifying information that identifies the outgoing tradeable item, and
  (iii) exchange options, wherein the exchange options presented to the user allow the user to select whether the second tradeable item is dispensed to the user, wherein the exchange options include acceptance of an exchange of the incoming tradeable item with the outgoing tradeable item and denial of the exchange of the incoming tradeable item with the outgoing tradeable item; and
 receive a particular selection of one or more of the exchange options from the user.

7. The item dispensing device of claim 6, wherein the dispensing of the outgoing tradeable item to the user is responsive to receiving user input that represents the acceptance of the exchange of the incoming tradeable item with the outgoing tradeable item.

8. The item dispensing device of claim 5, wherein the one or more processors are further configured to:
  select the second tradeable item from the repository, wherein a selection of the second tradeable item includes at least one of (i) randomized selection from the repository of tradeable items, (ii) first-in first-out selection from the repository of tradeable items, (iii) last-in first-out selection from the repository of tradeable items, and (iv) user selection from the repository of tradeable items.

9. A system configured to facilitate modifying game assets based on exchanged tradeable items via item dispensing devices, wherein the item dispensing devices dispense tradeable items that are real-world physical items, wherein the individual tradeable items are associated with one or more user accounts of an online gaming platform, wherein the one or more user accounts are associated with one or more users such that a first tradeable item is associated with a first user account of a first user, wherein one or more game assets included in the one or more user accounts are associated with the individual tradeable items, wherein the individual tradeable items that are associated with the one or more game assets facilitate modifying the one or more game assets, the system comprising:
  one or more processors configured by machine-readable instructions to:
    facilitate wireless communication sessions with individual item dispensing devices;
    obtain exchange information from the item dispensing devices during the wireless communication sessions with the individual item dispensing devices, wherein the exchange information indicates whether the first user exchanged the first tradeable item for a second tradeable item dispensed by a particular item dispensing device, wherein the exchange information indicates the receipt of the first tradeable item and dispensing of the second tradeable item, wherein the second tradeable item is dispensed in response to receiving the first tradeable item and further in response to verifying the first tradeable item is a valid tradeable item;
    record, within the online gaming platform, that the first tradeable item has been received; and
    responsive to recording the first tradeable item has been received, adjust one or more modifications that have been performed upon the one or more game assets based on the first tradeable item.

10. The system of claim 9, wherein adjusting the one or more modifications includes ceasing individual ones of the one or more modifications, diminishing individual ones of the one or more modifications, and/or enhancing individual ones of the one or more modifications.

\* \* \* \* \*